June 16, 1936.  C. W. ROBINSON  2,044,186
FERTILIZER DISCHARGING MECHANISM
Filed Oct. 16, 1933   2 Sheets-Sheet 2
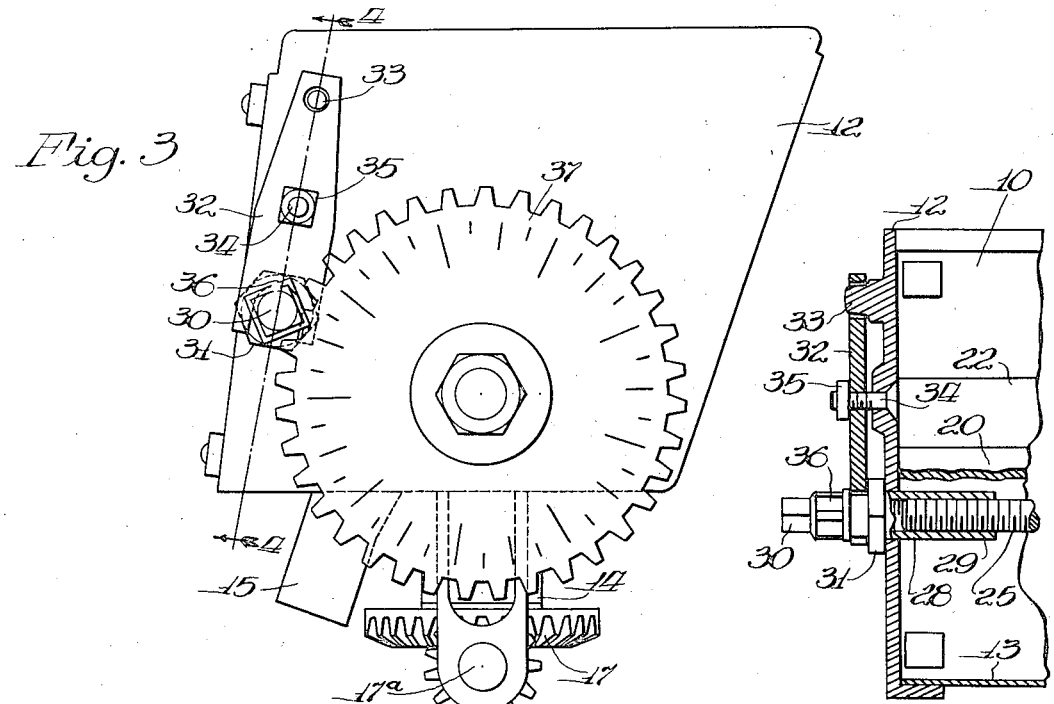
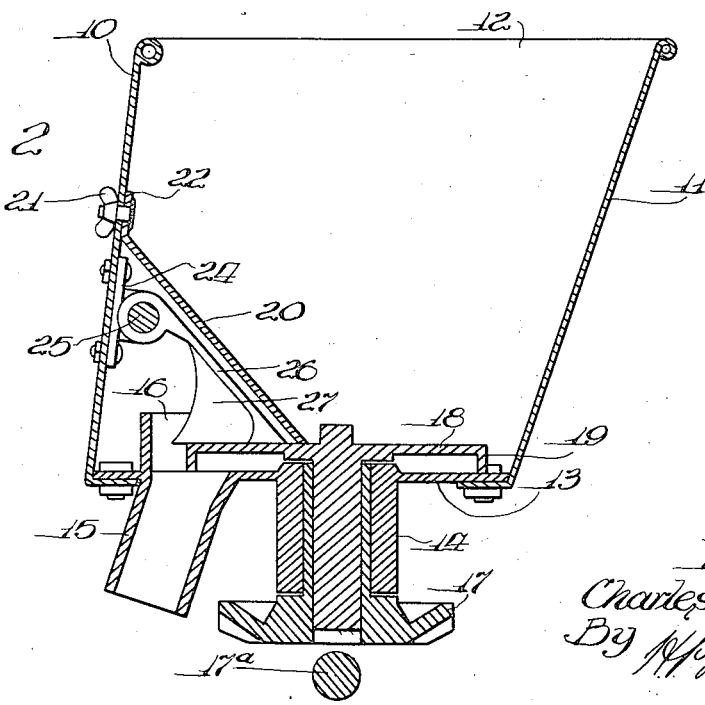
Inventor
Charles W. Robinson
By ...
Atty.

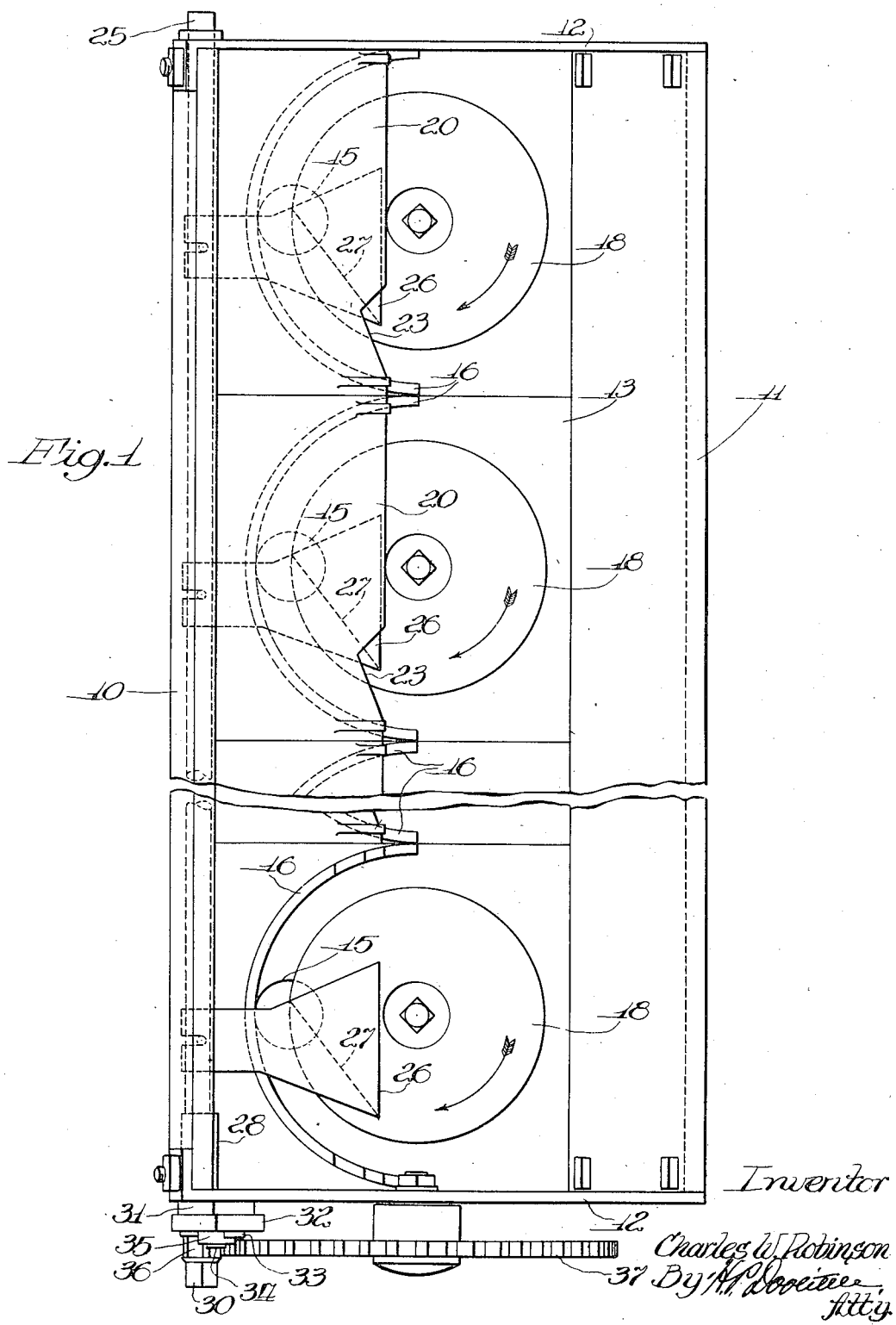

Patented June 16, 1936

2,044,186

UNITED STATES PATENT OFFICE 2,044,186

FERTILIZER DISCHARGING MECHANISM

Charles W. Robinson, Hamilton, Ontario, Canada, assignor, by mesne assignments, to International Harvester Company, Chicago, Ill., a corporation of New Jersey Application October 16, 1933, Serial No. 693,729

5 Claims. (Cl. 221—125)

The present invention relates to hopper discharging devices and more particularly to means for discharging a stream of granular or powdered material from a hopper while traversing a field, as practiced, for instance, with agricultural fertilizer distributors.

The principal object of the invention is to provide a form of feed mechanism capable of discharging the fertilizer in a constant stream, of small volume when desired, and to provide exact adjustment for quantity to be discharged. Other objects are to provide simple and efficient means for simultaneously and similarly adjusting a series or gang of discharging means and lock them at the desired adjustment, which adjusting means is preferably associated with an indicating wheel showing quantity at which the discharge is set.

The foregoing and other objects and advantages of the invention will become evident from the following description of the preferred structure illustrated by the accompanying drawings, where:

Figure 1 is a plan view of an elongated hopper provided with a series of discharging devices;

Figure 2 is a vertical cross-section through one of the discharging devices;

Figure 3 is an end view of the hopper, showing the adjusting shaft and indicator wheel; and, Figure 4 is a vertical section on the line 4—4 of Figure 3.

In the present instance, the invention is illustrated as embodied in the structure of a long distributor box or hopper, such as are used in fertilizer attachments for grain drills. The hopper is preferably of sheet metal and comprises the back wall 10, front wall 11, end walls 12, and a bottom plate 13 secured to inturned flanges on the lower edges of the walls. At regularly spaced intervals, the bottom plate 13 is provided with a vertical bearing sleeve 14 and with an outlet opening and conduit 15, just back of each sleeve. In order to confine and direct the fertilizer to the outlet, each outlet is embraced by a semi-circular vertical wall on ledge 16, the ends of which lie substantially in alignment with the centers of the sleeves 14. The sleeves 14 serve as bearings for the upwardly extending tubular shafts of driving gears 17, which are formed to interlock with the depending stems of the distributor or feeding disks 18, which rotate on the hopper bottom in the direction of the arrow on Figure 1. These disks are formed with a smooth polished upper surface and smooth rims, the rims being preferably formed with an angular marginal flange 19 (Figure 2), the edge of which rests on the hopper bottom. The disks are driven in unison by a shaft 17a carrying pinions in mesh with the gears 17, which shaft may be driven from the axle of the machine in the usual way.

The lower rear portion of the hopper in which the outlets are located is separated from the main body of the hopper by a series of inclined cut-off or back plates 20, there preferably being one such plate to each feed run or outlet, these plates joining to form a continuous wall from end to end of the hopper. Each plate is detachably secured to the back wall 10 of the hopper as by a screw bolt 21 engaging an upright flange 22 forming the upper edge of the plate. The lower edge of each plate contacts the surface of the feed disk 18 lying below it, the contact being on a straight line or chord intersecting the face of the disk near its axis, thus cutting off the rear portion of the disk from the charge or load of fertilizer contained in the main body of the hopper. At the side of each plate towards which the disk rotates, the lower edge of the plate is provided with a marginal opening or notch 23 extending over the outer margin of the disk and adapted to admit material carried thereby towards the outlet.

Under the back plates 20, the hopper wall carries a series of bearing brackets 24 (Figure 2) in which there is slidably mounted an endwise movable gate-rod 25 extending from end to end of the hopper. This rod carries a series of combined gate and deflecting members 26 which are pivoted on the rod 25, so that they may be raised when the back plates are removed, as for cleaning, but are suitably secured for shifting movement with the rod. The gate and deflecting members 26 each have a flat inclined face portion which widens towards the lower edge where it rests on the disk face just back of the lower edge of the back plate 20 and adjacent the notch 23 therein. This constitutes the gate portion of these members, as adjustment of the rod axially will cause more or less of each notch to be cut off, thus varying its effective area and controlling the amount of fertilizer passing through towards the outlets. On the under side of the flat gate portion of each member 26, there is provided a diagonally disposed deflecting wing 27 designed to sweep the fertilizer that is admitted through notch 23 from the face of the disk to the outlet 15. The lower edge of this wing rests on the surface of the feed disk, as shown.

As a preferred means for obtaining a fine adjustment of the gate-rod and fixing it at the desired adjustment, one end wall 12 of the hopper is provided with a bearing opening in which a tubular stub shaft 28 (Fig. 4) is journaled. The tubular portion of the shaft within the hopper has internal screw threads receiving the threaded end 29 of the shaft 25 thus providing a micrometer adjustment. This shaft is formed with a squared outer end 30 for engagement by a crank or wrench for turning it, and with a flange or shoulder 31 engaging the outside of the hopper wall. This flange cooperates with a friction clamp arm 32 which has a forked lower end engaging the shaft and resting against the shoulder 31. The other end of the clamp 32 is perforated to engage a supporting stud 33 on the hopper, and between its ends the clamp member is mounted on a bolt 34 carrying a clamp nut 35. When this nut is loosened, the shaft 25 can be turned to adjust the gates in unison and thereby the rate of discharge, and, upon drawing up the nut 5, the shoulder will be securely clamped against the side of the hopper and any accidental rotation of the shaft thereby prevented.

In order to indicate the quantity of fertilizer per acre, or in a given period of time, that will be discharged at each adjustment of the gate-shaft, the stub shaft 28 is formed with a pinion portion 36 in mesh with gear teeth on the periphery of an indicator wheel 37 suitably journaled on the end of the hopper and marked with graduations indicating the rate of discharge.

The use of smooth feed disks operating in conjunction with deflecting members and cut-off gates in the manner described affords a costruction which will feed granular fertilizer efficiently in variable quantity according to the gate adjustment, and which will permit the feeding rate to be cut down to a small quantity without affecting the reliability of operation. The preferred structure herein disclosed may be varied as to details of construction without departure from the invention as defined in the following claims.

What is claimed is:

1. In a fertilizer distributor having a hopper with a bottom outlet and a discharge regulating rod mounted in said hopper for movement axially, the combination with one end of said rod of an adjusting shaft journaled in one end of the hopper and projecting therefrom, a telescopic screw-threaded connection between said shaft and one end of the rod, and means on the end of the hopper for locking said shaft at any point against turning after adjustment of the rod by rotation of the shaft.

2. In a fertilizer distributor having a hopper with a bottom outlet and a rod mounted in said hopper above the outlet for movement axially the combination with said rod of an adjusting shaft journaled in one end of the hopper and projecting therefrom, a telescopic screw-threaded connection between said shaft and one end of the rod, means on the end of the hopper for locking said shaft at any point against turning after adjustment of the rod by rotation of the shaft, and an indicator wheel carried on the hopper wall and rotatable with said shaft.

3. In a bulk material distributor having a hopper with a longitudinal series of bottom outlets and an axially adjustable feed regulating rod mounted in the hopper above said outlets and controlling a series of seed discharging devices having parts mounted on said rod and movable therewith, the combination with said rod of micrometer means mounted on the hopper for adjusting said rod, dial means for reading said adjustment, and means for locking said micrometer adjusting means at any point in its range of adjustment whereby uniform distribution of material from each outlet may be had throughout the range of adjustment.

4. In a bulk material distributor having a hopper with a longitudinal series of bottom outlets and an axially adjustable feed regulating rod mounted in the hopper above said outlets and controlling a series of seed discharging devices having parts mounted on said rod and movable therewith, the combination with said rod of an adjusting shaft journaled in one end of the hopper and projecting therefrom, means for adjusting the regulating rod relative to said adjusting shaft comprising a screw threaded connection between said rod and shaft, means on said adjusting shaft adapted for rotating it, a shoulder formed on said shaft adjacent the outer side of the hopper wall, an adjustable clamping member on the hopper having a bifurcated portion contacting said shoulder on the adjusting shaft, and means for securing said clamping member in frictional engagement with said shoulder, whereby said adjusting shaft will be secured in adjusted position.

5. In a bulk material distributor as set forth in claim 4, an indicator wheel caried on the hopper wall, and means for rotating said indicator wheel from said adjusting shaft.

CHARLES W. ROBINSON.